July 7, 1931.  A. SMIROLDO  1,813,868
KNIFE GUARD
Filed July 17, 1930
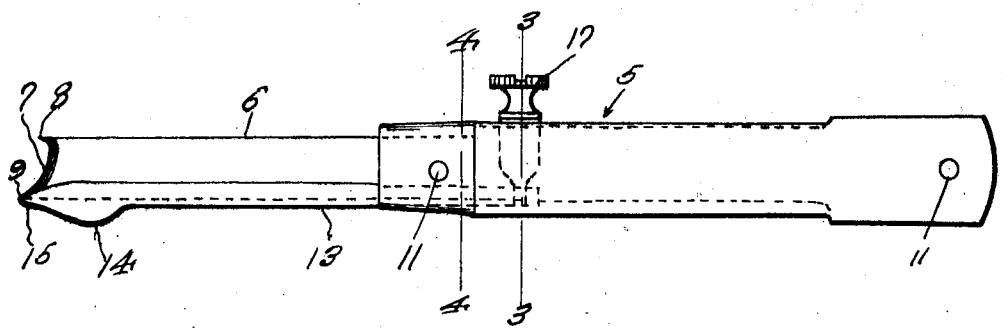
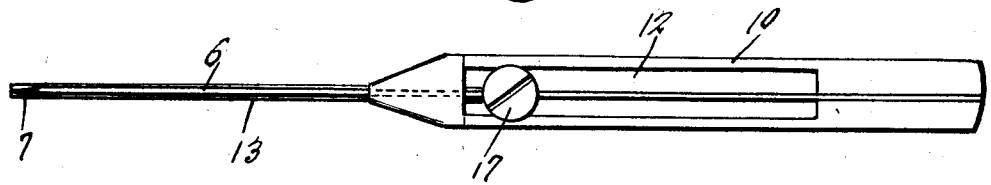
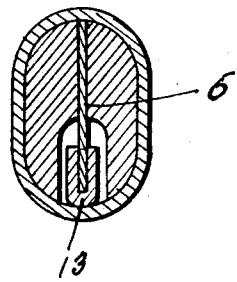
Inventor
Antonio Smiroldo
By *Clarence A. O'Brien*
Attorney Patented July 7, 1931

1,813,868

UNITED STATES PATENT OFFICE

ANTONIO SMIROLDO, OF AKRON, OHIO

KNIFE GUARD

Application filed July 17, 1930. Serial No. 468,693.

This invention relates to guards for knives and to prevent accidental cutting of goods being worked upon by said knives and particularly tools or knives which are of the hand tool variety.

The invention has particular reference to guards for shoemaker tools and particularly to a knife used by workers upon rubber boots and shoes, to prevent the accidental puncturing of parts of such rubber boots or shoes.

It is an object of this invention to provide a guard of this sort which would effectively prevent such accidental cutting, and which is simple and effective in operation, and which may be cheaply manufactured and composed of new and novel arrangement of parts.

It is not desired to restrict the application of this invention to the particular modification set forth herein and any change or changes may be made consistent with the scope of the invention. These objects and other and further objects, the nature of the invention, its composition, and arrangement of parts will be understood clearly by anyone acquainted with the art to which this invention relates by consulting the explanation below of the drawings appended hereto in which:

Figure 1 is a longitudinal elevation showing an embodiment of my invention partly in dotted line, and Figure 2 is a top view, Figure 3 is a section on the line 3—3 of Figure 1, and Figure 4 is a section through Figure 1 on the line 4—4.

Referring in detail to the drawings 5 designates generally a knife of the type described, having a shank portion 6 and a curved cutting edge 7 terminating in sharp points 8 and 9, said shank portion of the knife continuing into and fastened in a handle 10 attached at both ends of said handle as at 11. A slot 12 of the length of the blade 6 through the handle 7 and open from top to bottom in said handle is provided as shown.

Slidably engaged with the bottom edge of said blade is a channel member 13 having a humped portion 14 at said outer end, said humped portion terminating in a reduced rounded portion 15 which portion 15 is adapted to cover the sharp point of the edge 7. The hump 14 is adapted to ride upon the boot or shoe and facilitates the application of the tool thereto. This channel is adapted to have a sliding fit upon the knife blade 6 and to extend back to the recess 12 where a U-shaped strap 16 is attached thereto and is carried over the knife blade 6 as shown in Figure 3.

The U-shaped member 16 has a screw threaded hole in its top adapted to receive a screw 17 to tighten the channel guard in adjusted position on the knife blade.

By referring to Figure 3 it will be noted that the U-shaped member 16 has a contracted portion which is adapted to closely contact the sides of the blade 6, and the ends of the U-shaped member are attached to the channel guard 19. The bight portion of the U-shaped member is adapted to ride upon the upper edge of the knife blade 6 when the screw 17 is withdrawn therefrom.

It will be obvious that as the working edges of the knife wear down the screw 17 may be loosened and the guard may be retracted into the handle until the points 15 are in proper relation with the sharp point 9 when the screw may be tightened again so as to maintain said guard in effective position. Thus it will be seen that I have provided a simple, effective and novel means supplying a knife guard for the type of knife described, which is simple and effective in operation and economical and easy to manufacture, and admirably suited for the purposes for which it is designed.

Having thus described my invention, what I claim as new is:

1. A knife blade guard comprising a knife blade having an end cutting portion, a split handle mounted on said blade, and said handle having a longitudinal recess therein forming longitudinal spaces at each side of said blade, a channel guard member cooperating with the lower longitudinal edge of said knife and slidable thereon, and means in the recess of the handle adapted to slide said guard, and to adjustably fix said guard to cooperate effectively with said cutting edge of the blade.

2. A knife blade guard comprising a knife blade having an end concaved to form a cutting edge, a split handle mounted on said blade, and said handle having a longitudinal recess formed completely therethrough forming spaces at each side of said blade, a channeled guard member receiving and slidable on the lower longitudinal edge of said knife blade, and an adjustable clamping member riding on the upper edge of the blade and embracing the sides thereof within the recess of the handle, and attached to the end of the guard extending therein, and adapted to slide said guard, and to adjustably extend said guard to cooperate with said cutting edge of the blade, and for fixing the same in said adjusted position.

In testimony whereof I affix my signature.

ANTONIO SMIROLDO.